United States Patent
Chen et al.

[11] Patent Number: 5,871,347
[45] Date of Patent: Feb. 16, 1999

[54] ROTARY REGENERATIVE OXIDIZER

[75] Inventors: James M. Chen, Edison; Pascaline H. Nguyen, Holmdel; James C. Fu, Plainsboro, all of N.J.

[73] Assignee: Engelhard Corporation, Iselin, N.J.

[21] Appl. No.: 831,108

[22] Filed: Apr. 1, 1997

[51] Int. Cl.⁶ .................................................. F01N 3/10
[52] U.S. Cl. ............................ 432/72; 422/173; 422/175
[58] Field of Search .................................. 422/173, 175; 423/210; 165/7, 8; 432/72; 110/210–212

[56] References Cited

U.S. PATENT DOCUMENTS

| | | | |
|---|---|---|---|
| 4,678,643 | 7/1987 | Fetzer | 422/175 |
| 4,834,962 | 5/1989 | Ludwig | 422/175 X |
| 5,016,547 | 5/1991 | Thomason | 110/211 |
| 5,169,414 | 12/1992 | Panzica et al. | 55/60 |
| 5,460,789 | 10/1995 | Wilhelm | 422/175 X |
| 5,547,640 | 8/1996 | Kim | 422/177 |
| 5,562,442 | 10/1996 | Wilhelm | 432/72 |
| 5,589,142 | 12/1996 | Gribbon | 422/171 |
| 5,628,968 | 5/1997 | Hug et al. | 422/173 |

FOREIGN PATENT DOCUMENTS

WO 94/23246  10/1994  WIPO.
WO 96/20039  7/1996  WIPO.

OTHER PUBLICATIONS

Girocat Sales Brochure, G E C Alsthom, Air Industrie Systemes.
rotosolv, rotocat Sales Brochure.

*Primary Examiner*—Christopher Kilner
*Attorney, Agent, or Firm*—Lyon, P.C.

[57] ABSTRACT

A system for the abatement of industrial process gases utilizes a rotary regenerative oxidizer comprised of one or more heat exchange beds, each bed comprised of a parallel, axial, and longitudinal array of heat regenerative channels that thermally and/or catalytically oxidize contaminated gases. Utilizing a rotary regenerative oxidizer, and if desired, a plurality of heat regenerative beds incorporated therein, facilitates the use of regenerative technology at lower gas flow rates, increases thermal efficiency, and significantly reduces the floor space normally required when implementing fixed-bed nonrotary regenerative oxidizers. The heat exchange channels may be catalytically treated to enhance oxidation of the pollutants at a lower temperature.

8 Claims, 4 Drawing Sheets

ROTARY REGENERATIVE OXIDIZER

BACKGROUND OF THE INVENTION

The present invention relates generally to the abatement of contaminant laden industrial process gases and more particularly, to an abatement system which utilizes a rotary regenerative oxidizer.

Industrial process gases typically contain particulates and major gaseous air pollutants such as volatile organic compounds (VOCs) and carbon monoxide (CO), which contaminate the environment when vented to the atmosphere. Thermal and catalytic oxidizers are generally used to eliminate these contaminants. Thermal oxidizers utilize a supplementary heat source to increase the temperature of the inlet process gas to a level above the ignition temperature of the combustible contaminants, generally ranging from 1400° F. ($\approx$760° C.) to 1800° F. ($\approx$980° C.), so as to oxidize combustible contaminants such as VOCs and CO. Catalytic oxidizers further utilize a catalytic material to effect oxidation at lower peak temperatures.

Regenerative thermal and catalytic oxidizers (RTOs and RCOs) recover heat remaining in the cleansed exhaust gas, and through heat exchange, increase the temperature of gases entering the oxidizer thereby minimizing the amount of supplemental energy required to bring the gas to its ignition temperature. RTOs and RCOs generally operate in cycles and comprise a plurality of regenerative beds and a corresponding number of catalytic beds if an RCO is utilized. Characteristically, flow control valves are used to direct the inlet process gases to one or more regenerators for preheating prior to thermal or catalytic oxidation. RCOs and RTOs are generally of a fixed-bed design wherein the unit remains stationary as the process gases pass through for purification. One related concern is the relatively large floor space occupied by such a fixed-bed arrangement.

Catalytic oxidation, in contrast to thermal oxidation, reduces energy costs by lowering the reaction temperatures. Catalytic reaction temperatures typically range from 200° to 400° C. as compared to 700° to 980° C. required in thermal incinerators. However, catalytic reaction temperatures are still substantially greater than most flue gas temperatures and therefore, heat exchangers are frequently used as part of a control system to further lower the energy costs.

Regenerative or recuperative heat exchangers are commonly used in both RTOs and RCOs. Regenerative heat exchanger systems have a relatively higher thermal efficiency, typically 70 to 95%, while recuperative systems achieve at best 70% thermal efficiency. Most regenerative systems incorporate flow reversal design combined with heat sink packing material to achieve an optimum thermal efficiency. However, regenerative heat exchangers are expensive to implement and therefore, are generally only used for industrial process flow rates of approximately 850 $Nm^3$/minute or 30,000 SCFM (standard cubic feet per minute), or more. Recuperative heat exchangers are less expensive to implement, and thus are incorporated with industrial process flow rates of approximately 3 $Nm^3$/minute–850 $Nm^3$/minute or about 100–30,000 SCFM.

In a fixed-bed regenerative unit, the polluted gases first flow through an input heat regenerative bed, and then are oxidized before exiting the unit through an output heat regenerative bed. Heat absorbed by the process gases is transferred to the output heat regenerative bed for preheating of process gases subsequently entering the bed. Valve design facilitates process gas flow reversal and preheating thereof by directing the polluted influx into regenerative heat beds that functioned as output regenerative beds in the prior treatment cycle. A related concern, however, is that the characteristic flow reversal causes pressure fluctuations that may adversely affect the upstream process conditions. Furthermore, fixed-bed systems experience pressure drops, and as such, increased energy costs in order to maintain a consistent linear gas velocity.

Recuperative systems generally use a heat transfer surface as a medium to transfer heat, for example, in plate or shell designs. In addition to limited thermal efficiency, recuperative systems have associated mechanical concerns including condensation and corrosion. Condensation and corrosion are caused by uneven heating which forms "cold spots" on the heat exchange surface. Furthermore, use of a recuperative heat exchanger results in excess energy consumption due to high pressure drops across the heat exchange surface.

DESCRIPTION OF THE RELATED ART

U.S. Pat. No. 5,562,442, to Willed, discloses a regenerative thermal oxidizer having an intricate, multicomponent, rotary distributor that directs the various flow regimes. The distributor is comprised of a number of parts that complicates and increases the costs of the manufacturing process. A heat exchange bed comprised of two segments filled with ceramic granules transfers heat to or from the gases, but has an inherent pressure pulse associated with a change in gas flow as the flow through each segment is alternated.

International Application Number, PCT/US93/05453, discloses a regenerative gas treatment system that circulates gas permeable blocks, arranged on the periphery of a rotor, as a heat transfer means. The circulating rotor is constructed of a cage containing heat exchange blocks separated by partitions. Several disadvantages are associated with this design. The partitions add to the manufacturing costs, decrease the flow efficiency through the system, and when constructed of metal, are susceptible to leaks due to a separation of the walls caused by the thermal stresses of heating and cooling. Furthermore, the design necessitates an independent sealing means to separate the input and output streams. The perpendicular gaseous flow against the arcuate edges of the converging heat exchange blocks also detracts from flow and treatment efficiency. Designs such as this may not readily accommodate lower gas flow rates.

International Application Number, PCT/FR95/01692, has a design similar to that of PCT/US93/05453, and therefore has similarly associated disadvantages. This system incorporates an inner annular catalytic bed, independent of the heat exchange media, designed to enhance the treatment efficiency of the system.

U.S. Pat. No. 5,016,547, to Thomason, teaches the use of a rotary valve regenerative oxidizer. Rotary valve designs generally incorporate stationary partitions inside the heat sink bed to divide the bed into multiple zones. These partitions, which extend from the bottom to the top of the bed are susceptible to maintenance disadvantages due to leakage and stress cracks, and are also costly to construct. The rotation of the rotary valve must be indexed, providing a workable, but more complicated design.

SUMMARY OF THE INVENTION

The aforesaid disadvantages are solved, in accordance with a preferred constructed embodiment of the present invention, by an abatement system for industrial process gases comprising a rotary regenerative oxidizer. The present invention oxidizes particulates, VOCs and CO in a heat regenerative bed containing a plurality of axially parallel, discrete, and longitudinally disposed, heat exchange channels.

An abatement system of the present invention, unlike fixed-bed systems which operate in cycles, operates in steady state. A first embodiment comprises a rotatable catalyzed heat regenerative bed in fluid communication with a transfer chamber. The process gases flow from a contaminated feed duct through an inlet portion of the rotary regenerative oxidizer, for heating and catalytic oxidation therein. The process gases then flow through a transfer chamber, which, if desired, thermally oxidizes any remaining VOCs and CO present in the gases, and thence back through an output portion of the catalytic regenerative rotor for venting to atmosphere or other use.

A second embodiment also operates in steady state and comprises a stationary catalyzed heat regenerative bed, and, a one-piece rotary element that continuously rotates the air flow entering and exiting the bed, thereby alternating the various gas flows through the system.

If desired, the present invention may accommodate a purge stream which redirects cleansed exhaust air or other air back through the regenerative bed, thereby removing trapped contaminants. Furthermore, the aspects of the present invention also correspond to embodiments containing an uncatalyzed thermal oxidizer of the same novel heat regenerative design.

Although the embodiments may be illustrated in certain spatial orientations, one skilled in the art will readily appreciate that the rotary oxidizers of the present invention may be horizontally, vertically, or otherwise orientated.

DETAILED DESCRIPTION OF THE PREFERRED EMBODIMENT(S)

Figure 1:
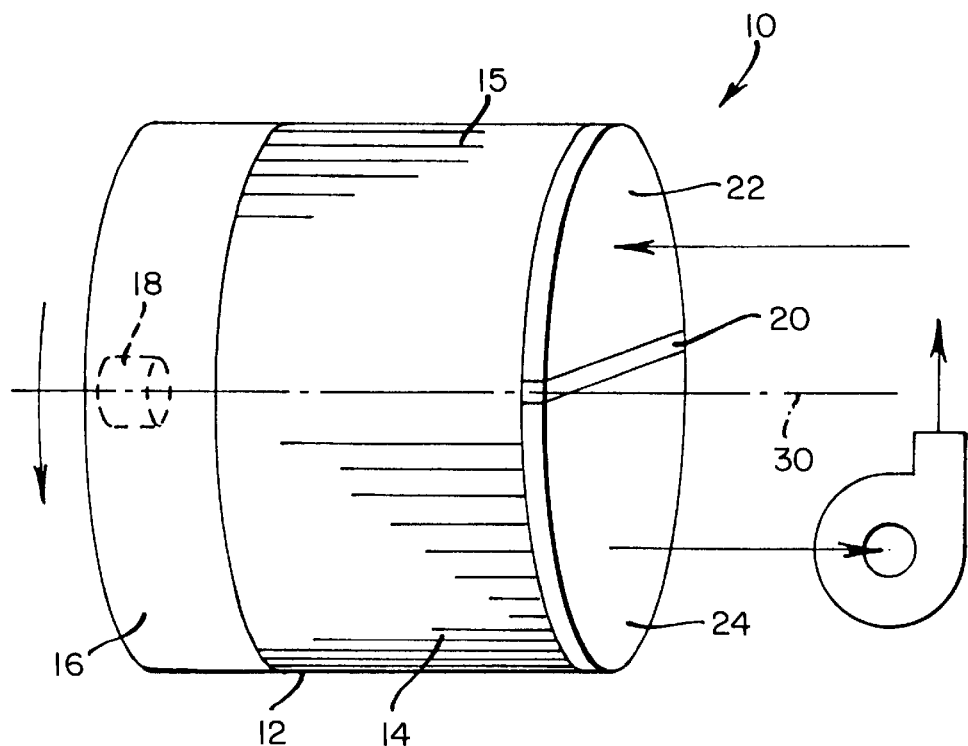
FIG. 1 schematically illustrates a first embodiment of a rotary regenerative catalytic oxidizer, having a rotatable heat regenerative bed.
Figure 2:
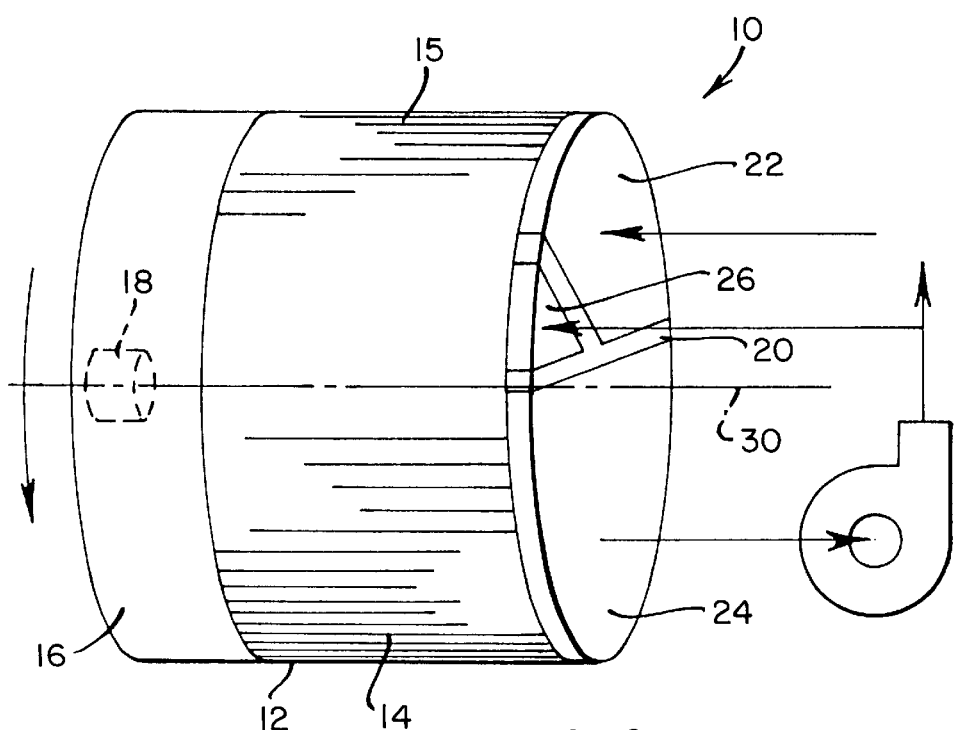
FIG. 2 schematically illustrates a first embodiment of the rotary regenerative catalytic oxidizer having a purge stream.

In accordance with a first embodiment of the present invention, a rotary regenerative catalytic oxidizer 10 (hereinafter "RCO"), is shown in FIG. 1 and contains a cylindrical housing 12. A cylindrical catalytic regenerator rotor 14 is disposed within housing 12. A transfer chamber 16 is sealed and connected to housing 12 at a second end of rotor 14. A heater device 18 is disposed within chamber 16. The heater device 18 may comprise a burner, an electric heater, or other heat generating means and may be utilized either externally or internally of chamber 16. A first sealing endplate 20 is stationary and adjoins a first end of the rotor 14, thereby dividing the rotor 14 into an inlet compartment 22 and an outlet compartment 24. As seen in FIG. 2, endplate 20 may be modified in accordance with a second embodiment of the present invention to further include a purge compartment 26 within the rotor 14. Endplate 20 may be sealed to the rotor 14 either physically, pneumatically, hydraulically, or by any other method known in the art. A longitudinal axis 30 is centrally disposed within RCO 10, about which the rotor 14 rotates.

Rotor 14 is preferably constructed from a plurality of discrete and axially parallel, longitudinally disposed surfaces forming channels 15, each having a first and a second end. Each channel is constructed from heat exchange media such as ceramic, Cordierite for example, or metal, stainless steel for example. Other metals that may be used include aluminum, carbon steel, and stainless steel. The preferred design is not limited to any geometric shape, and round, square, hexagonal, or other cross-sectional configurations may be utilized. More importantly, the heat exchange channels 15 form a monolith that is free from independent internal partitions that divide the heat exchange area into different flow regimes.

Depending on design criteria, the axially parallel heat exchange surfaces may be either completely or partially washcoated with a catalyst such as $Pt/TiO_2$, manganese, chromium oxide, or combinations thereof. In accordance with the present invention, longitudinally disposed channels reduce pressure fluctuations, and, due to impermeable walls, prevent the exchange of gases in the adjacent channels and eliminate the need for a separate sealing means between the ingoing and outgoing process gases. The heat exchange media should have a cell density ranging from at least 25 CPSI (cells per square inch), but more preferably 64 CPSI, to 1000 CPSI or higher, to have sufficient area to enhance both heat and mass transfer and reduce the size of the rotor 14. However, one of ordinary skill in the art will readily appreciate that such a design factor should not be construed as limiting the scope of the present invention.

In operation and during rotation of the RCO, process gases enter through inlet 22 and pass through the rotor 14 and channels 15 for catalytic oxidation of the contaminants therein. The process gases then pass through transfer chamber 16, and may be thermally oxidized therein, if desired. The heater device 18 may be simply used to control the fuel and supply the heat necessary for startup of the catalytic process, or it may be used on a continuous basis, thereby facilitating thermal oxidation within chamber 16. Fuel, for example natural gas, is supplied to the transfer chamber 16, through the heater device 18. The purified gases are then directed back through channels within outlet compartment 24 and exhausted. As seen in FIG. 2, a fraction of the purified outlet stream or other clean air may be diverted back into the RCO through an optional purge compartment 26. Other purge methods, by vacuum for example, may also be incorporated.

As rotor 14 rotates, each of the channels 15 periodically passes through inlet compartment 22 through which process gases enter the RCO 10. If the purge option is desired, as the same channels continue to revolve, they next pass through purge compartment 26, wherein purified air forces any unreacted process gases into chamber 16. As shown in FIG. 2, purge compartment 26 is located between inlet and outlet compartments 22 and 24, respectively. When the channels 15 function as inlet channels, a spike of contaminated air may become trapped therein. The purge feature prevents the contaminated air from being released as the channels subsequently rotate into the output compartment and function as exhaust channels.

Upon further rotation, the channels 15 then pass through outlet compartment 24 from which purified air from transfer chamber 16 is exhausted. At the same time, the regenerative channels retain the heat of combustion thereby maximizing fuel efficiency and providing the catalytic heat necessary during the input function. At any given moment, rotor 14 comprises a plurality of grouped channels that are segregated into either an inlet, purge, or outlet function. As shown in FIGS. 1 and 2, the function of a given channel will vary as it revolves through the different flow regimes defined by endplate 20.

Figure 3:
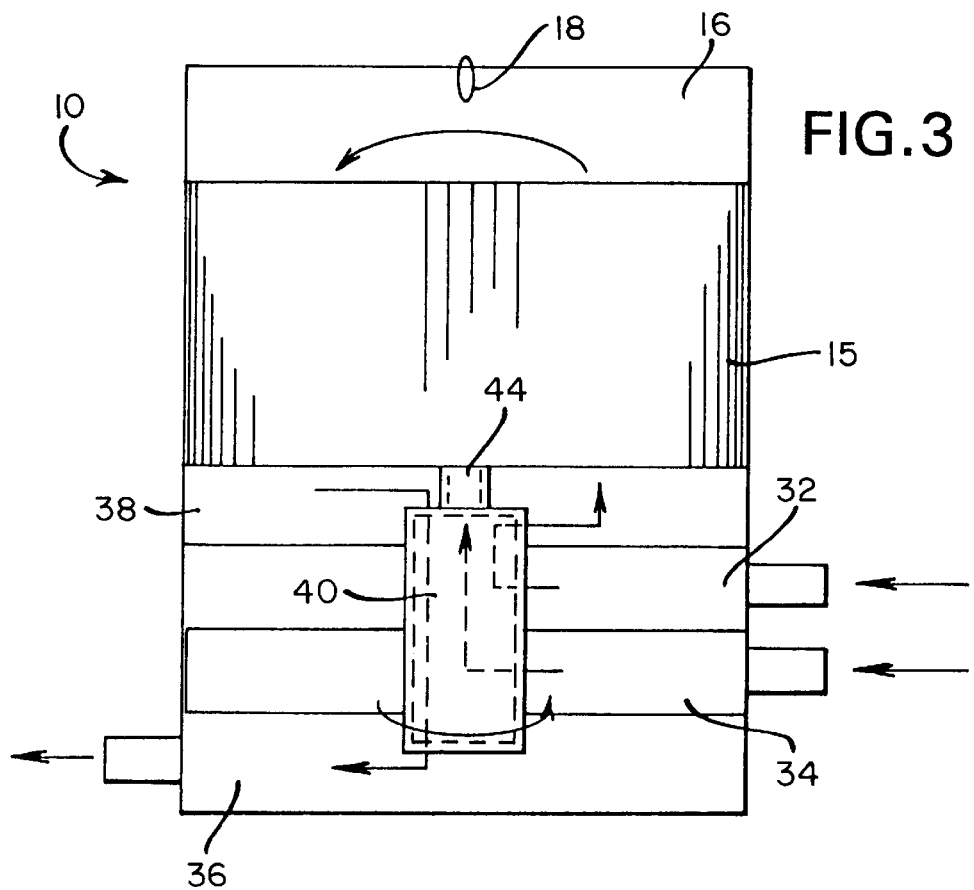
FIG. 3 schematically illustrates a second embodiment of the rotary regenerative catalytic oxidizer, having a rotary element and a stationary heat regenerative bed.
Figure 4:
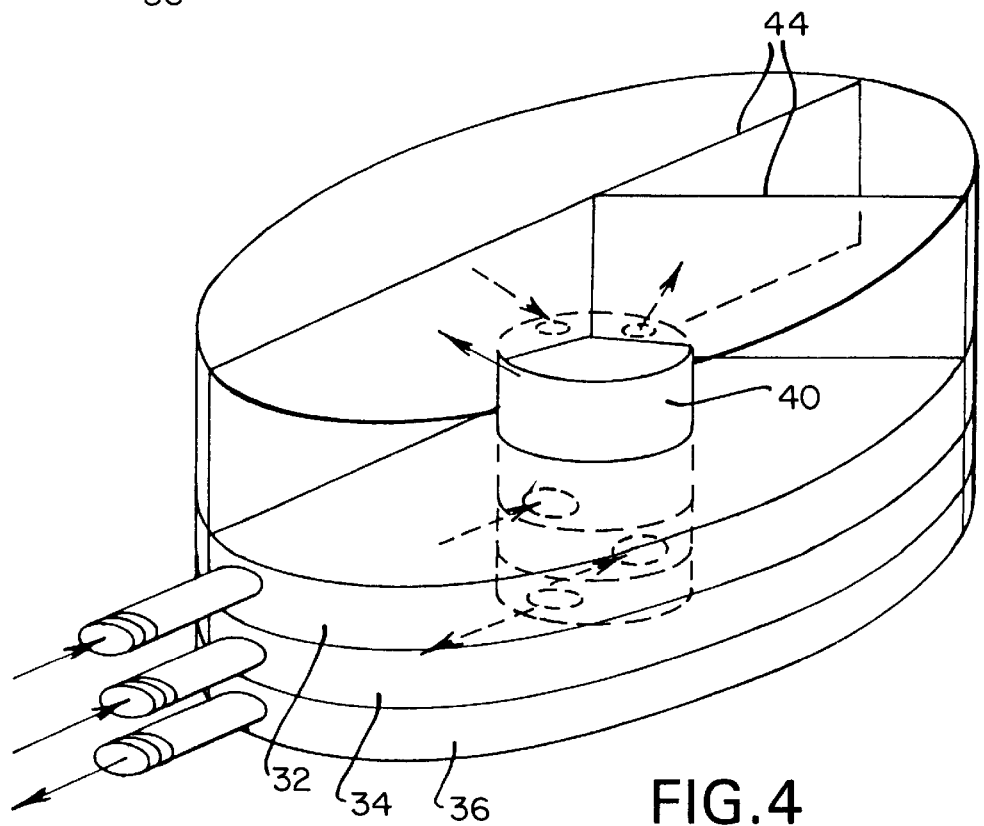
FIG. 4 schematically illustrates an expanded view of the rotary element of the second embodiment.

In accordance with the present invention, a second embodiment is shown in FIGS. 3 and 4. The second embodiment is better suited for handling large gas flows that require a large size of heat sink material. The heat exchange channels 15, having a first and a second end, are stationary. As in the first embodiment, a transfer chamber 16 is sealed and connected to housing 12 at a second end of rotor 14. A heater device 18 is disposed within chamber 16. The heater device 18 may comprise a burner, an electric heater, or other heat generating means and may be utilized either externally or internally of chamber 16. A plurality of layered sections are located at a first end of RCO 10. Section 32 comprises an input chamber, section 34 comprises an optional purge chamber, and section 36 comprises an output chamber. Section 38 comprises a dividing chamber that lies adjacent to, and in fluid communication with, the first ends of the channels 15. A one-piece rotating element 40, having a first and a second end, rotatably extends through the input, purge, output, and dividing chambers. Element 40 is internally divided into three separate passages, each passage forming a separate flow path and communicating with either the input, purge, or output chamber. Dividing plates 44, rotatably engaged within chamber 38, comprise the second end of element 40, and divide chamber 38 into alternating input, purge, and output zones. As shown in FIG. 4, element 40, comprising plates 44, rotates as a one-piece flow distributor, providing alternating gaseous flow to the several zones. Dividing plates 44, radially spanning the RCO 10, are sealed against the first end of the channels 15, thereby creating input, purge, and output sections within the plurality of heat exchange channels. Plates 44 may be sealed either pneumatically, hydraulically, physically, or by other methods known in the art.

In operation, an input stream flows into chamber 32, through rotating element 40, into the inlet zone of chamber 38, and through the input section of heat exchange channels 15 for catalytic treatment. The gas then flows into transfer chamber 16 for further thermal oxidation if desired. The heater device 18 may be simply used to supply the heat necessary for startup of the catalytic process, or it may be used on a continuous basis, thereby facilitating thermal oxidation within chamber 16. The gases are forced through the transfer chamber 16 back through the outlet section of channels 15, thence through the outlet zone of chamber 38, through element 40, into chamber 36, and out of the RCO 10. A fraction of the output stream, or other air, may be directed into the purge stream flowing into chamber 34, through element 40, into the purge zone of chamber 38, through the purge section of channels 15, through the transfer chamber 16 and into the exhaust gas. Any other known purge method, by vacuum for example, may also be utilized. As the rotating element 40 and the dividing plates 44 continue to rotate, the stationary heat exchange channels 15 alternate in function, whereby one channel will serve an input, purge, and output function upon one complete rotation of the element 40. The load required to turn the rotating element 40, in contrast to turning the rotor 14 in the first embodiment, is substantially reduced.

Figure 6:
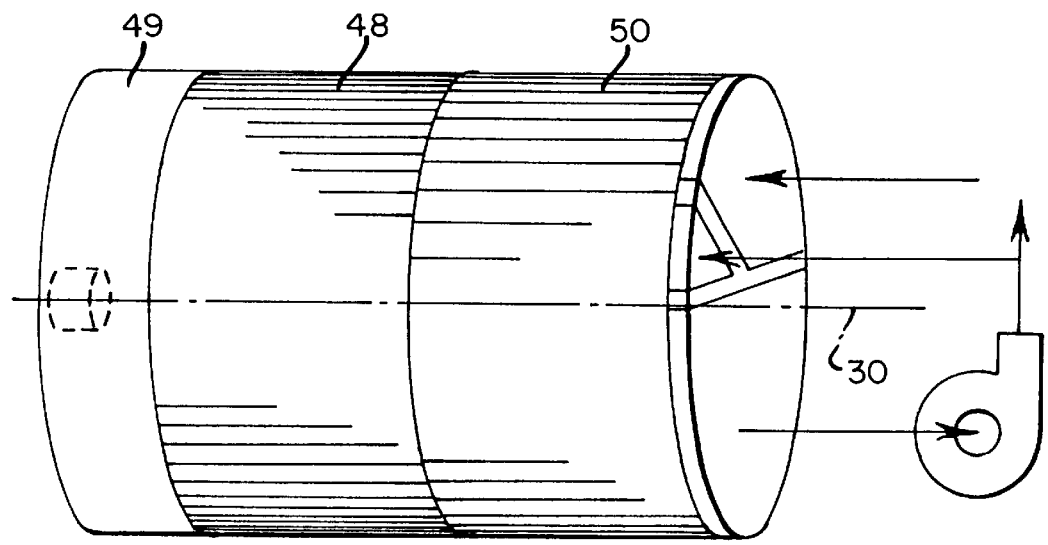
FIG. 6 illustrates a third embodiment of a rotary regenerative catalytic oxidizer having two in-line rotatable heat regenerative beds.
Figure 7:
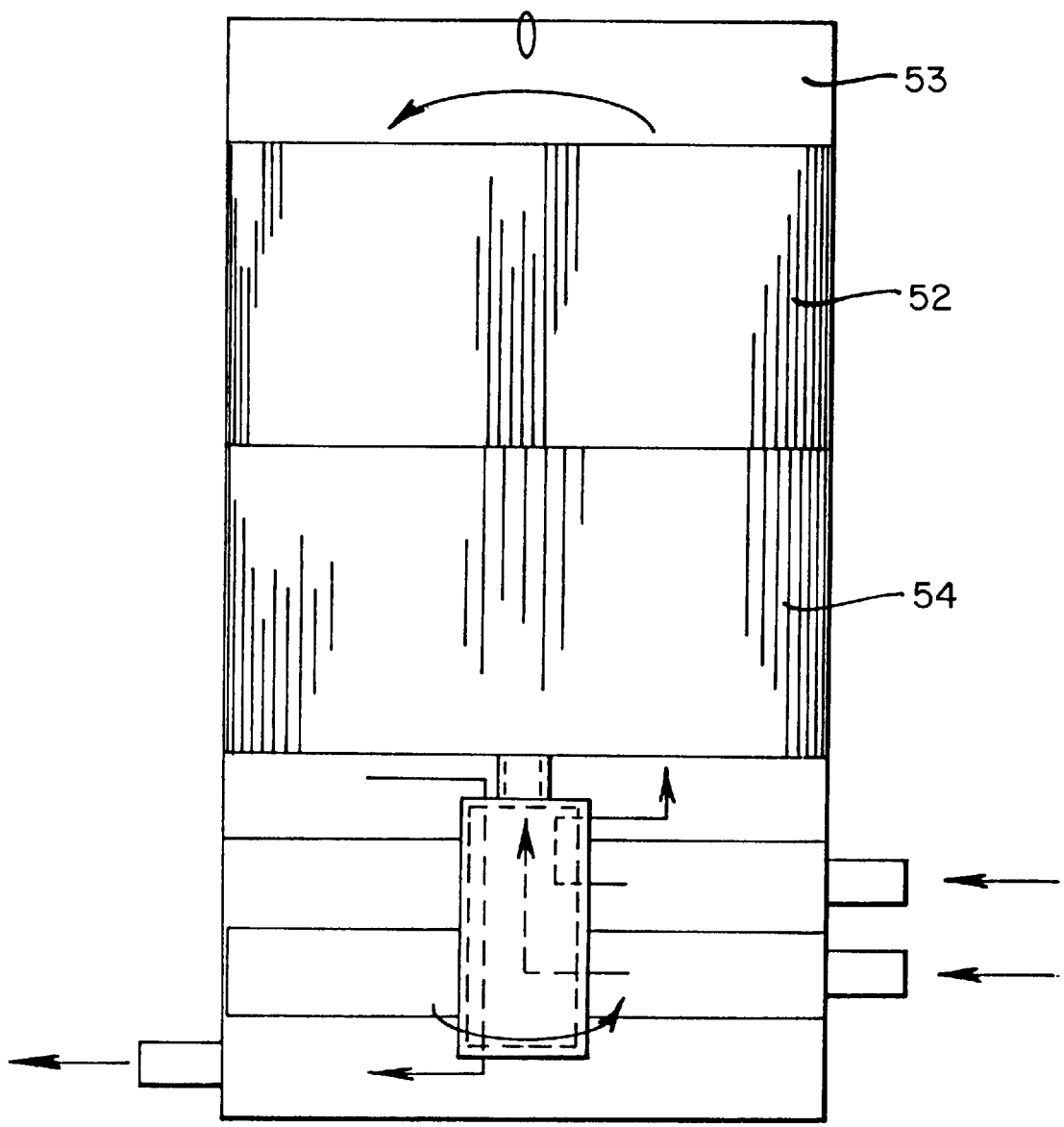
FIG. 7 illustrates a fourth embodiment of a rotary regenerative catalytic oxidizer, having a rotary element and two in-line stationary heat regenerative beds.

Generally, purge options are included for high VOC contaminated process gases. In accordance with yet another aspect of the present invention, purification of high-VOC gases may be enhanced by utilizing a combination of two or more in-line rotary heat exchange beds. The in-line rotors function essentially as that described in the first embodiment above. As shown in FIG. 6, the unit comprises a downstream and upstream rotor, 48 and 50 respectively, in close proximity to each other and rotating at the same speed. Alternatively, the upstream rotor may rotate and the downstream rotor may be fixed in place wherein the upstream rotor actually functions as an RCO and as a flow distributor for the downstream rotor. Furthermore, as shown in FIG. 7, a fourth embodiment may comprise two in-line stationary heat regenerative beds that incorporate a flow distributor as described in the second embodiment above. As shown in FIG. 7, the unit comprises a downstream and upstream heat regenerative bed, 52 and 54 respectively, in close proximity to each other.

In operation, and in accordance with FIGS. 6 and 7, the process gases first pass through the upstream rotor and are then directed through the downstream rotor. The upstream rotor 50 or 54, is preferably formed from heat exchange channels of relatively thick walls and low cell density, and has an approximate 40–50% void volume existing between the walls. The downstream rotor 48 or 52, is formed from heat exchange channels of relatively thin walls and high cell density, and has an approximate 60–80% void volume. The downstream rotor 48 or 52 is equipped with a transfer chamber 49 or 53, as in the first and second embodiments described above. The thick wall/low cell density rotor within the upstream rotor increases heat storage, reduces VOC carryover from the colder zone, and also reduces the pressure drop through the unit. After first being heated by the upstream rotor 50 or 54, the process gases increase in temperature and create a hotter temperature zone within the downstream rotor 48 or 52. Because of the higher temperature, a relatively higher cell density can be used within the downstream rotor 48 or 52 to increase gas/solid contact area, and thereby increase the destruction efficiency. Depending on design expedients, each of the in-line rotors may be comprised of honeycombed channels formed from different materials. For example, the upstream rotor may comprise a honeycombed metallic bed, while the downstream rotor may comprise a honeycombed catalyzed ceramic bed.

With regard to the first and third embodiments, the rotor 14 rotates at 0.5 to 10 revolutions per minute, depending on the thermal efficiency desired. For example, if high-VOC process gases are directed into the RCO 10, then the cycles per minute can be decreased to lower the thermal efficiency and operate under a self-sustaining mode. On the other hand, if low-VOC process gases are directed into the RCO 10, the cycles per minute can then be increased to raise the thermal efficiency and lower the energy consumption. The rotating element 40 of the second embodiment may be similarly adjusted to modify the thermal efficiency.

The RCO 10 is significantly smaller than an RCO of fixed-bed design, and yet has an equivalent thermal efficiency. Thermal efficiency, or $\mu$, can be expressed by the following formula:

$$\mu = (T_{max} - T_{out})/(T_{max} - T_{in})$$

where T represents temperature.

Thermal efficiency depends on a number of complex factors. For a given gas flow, thermal efficiency increases with increasing heat transfer rate between gas and solids, increasing the solid thermal mass, and decreasing the cycle time. Mathematically, thermal efficiency can be expressed as a function of two parameters: reduced length and reduced period.

(1) thermal efficiency=f(reduced length, reduced period)

where, (2) L=reduced length=hA/mfcf and, (3) Rp=reduced period=(hA/MsCs)*P

Figure 5:
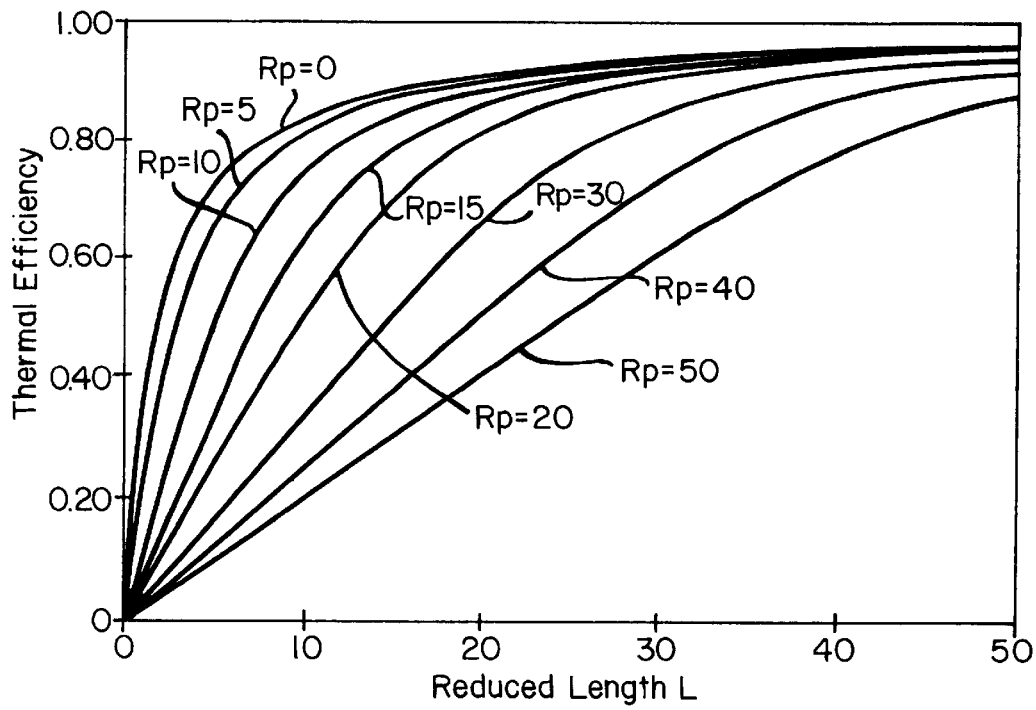
FIG. 5 is a graph illustrating the effect of reduced length and reduced period on thermal efficiency.

As given in the equations, h is the heat transfer coefficient, A is the heat transfer area, and mf and Cf are gas flow and gas specific heat, respectively. Ms and Cs are solid mass and solid specific heat, respectively. P is the period of a regenerator zone before switching. FIG. 5 illustrates the relationship of thermal efficiency with regard to reduced length, L, and reduced period, Rp.

The heat transfer area, A, can be varied by using different shapes and sizes of heat transfer material. A smaller size regenerator packed with high geometric area material and a large regenerator packed with a lower geometric area material may have the same heat transfer zone, or reduced length. Nevertheless, the thermal efficiency of the smaller regenerator would be less than that of the large regenerator if the cycle period was the same for both. The smaller thermal mass of the small regenerator results in a larger number of the reduced period. As shown in FIG. 5, the thermal efficiency decreases as the reduced period is increased and as the reduced length is decreased.

For a fixed-bed RTO/RCO, the cycle time typically operates at 60–180 seconds, and then the gas flow is reversed. Any further reduction in the cycle period, created by switching the flow valves at time intervals of less than 60 seconds, is limited by consequential pressure pulses resulting in unsteady operation. Unlike the fixed-bed system, the rotary design of the present invention does not have flow reversal problems. The cycle time can be reduced with no adverse effect on unit stability, or on upstream process conditions. As such, a rotary regenerative oxidizer, in accordance with the present invention, can take full advantage of a high geometric area packing system, thereby reducing the volume of the oxidizer while maintaining an equivalent thermal efficiency. As Table 1 below shows, when using a honeycomb of 200 CPSI, the bed of a rotary regenerator can be as small as ¹⁄₁₀ the size of a typical conventional fixed-bed regenerative system.

TABLE 1

RRCO compared to a fixed-bed RCO, each having a constant heat capacity and a thermal efficiency of 92%.

|  | RRCO | FIXED-BED RCO | FEATURES |
|---|---|---|---|
| HEAT REGEN. MEDIA | 200 CPSI MONOLITH | 1" SADDLE | RRCO HEAT TRANSFER MUCH HIGHER |
| HEAT TRANSFER AREA | 640 ft$^2$/ft$^3$ | 70 ft$^2$/ft$^3$ |  |
| CYCLES | ROTATES 10 RPM (CONTINUOUS) | 1 to 3 MIN EACH PERIOD | RCO LIMITED BY VALVE SWITCHING |
| GAS FLOW RATE PER VOLUME OF HEAT TRANSFER MATERIAL | 20,000 1/hr | 2,000 1/hr | RRCO VOLUME = 1/10 RCO VOLUME, FOR SAME GAS FLOW RATE AND SAME $\mu$ |

In accordance with the present invention, continuous rotation of the rotor facilitates steady state treatment of the process gases. The thermal efficiency can be decreased from 92% to 87% simply by reducing the rotational speed from 10 rpm to 1 rpm. The simple method of adjusting thermal efficiency represents a significant improvement when handling streams that contain varied solvent loading. As the solvent loading becomes relatively high, the thermal efficiency must be lowered to maintain a thermal balance. Certain known rotary designs incorporate a rotational feature that indexes the rotor. Continuous rotation, in contrast to indexing, permits simplified tailoring of the cycle period and thus, a corresponding decrease or an increase in the thermal efficiency if desired. On the other hand, fixed-bed, non-rotary recuperative systems are even less flexible and often require a unit shut down that effectively blocks off some of the heat exchange surface.

In accordance with applications of the present invention involving flow rates of 100 to 30,000 SCFM, the rotary heat exchange designs of the present invention reduce the pressure drops, and the associated energy costs, by more than half when compared to fixed-bed designs. Possible applications include purification methods involving groundwater treatment, indoor air clean up, paint spray booths, paper and pulp gases, and manufacturing of electronic components.

Unlike known fixed-bed RCOs, the present invention accommodates flow rates of 100–30,000 SCFM in a regenerative heat exchanger at a reasonable capital cost. Of course, larger flow rates may be accommodated by an increase in the size of the rotary RCO. Unlike conventional fixed-bed RCOs that have periodic flow reversal as a heat recovery means, the rotary RCO 10 features parallel channels 15 that revolve as rotor 14 rotates, or a rotatable flow distributor 40, each of which operate in steady state. Thus, pressure fluctuations associated with fixed-bed RCO designs are eliminated.

The rotary RCO is generally operated in flow rates normally found with recuperative heat exchangers. In contrast to a recuperative heat exchanger, a rotary regenerative heat exchanger provides a more uniform axial temperature, and therefore more uniform surface temperatures. As such, recuperative heat exchanger concerns such as corrosion caused by "cold spots", condensation, and poor thermal efficiency are eliminated.

Unlike many rotary treatment systems of the related art, a preferred embodiment of the present invention combines the thermal and catalytic components into one bed. In contrast to gaseous flow perpendicular to the axis of rotation, the input and output flow efficiency is enhanced by directing the flow through axially parallel channels. Furthermore, the only independent sealing means required is the sealing plate 44 located at the "cold" or input/output end of the system. The inherent seals of the heat exchange channels ensures simplified flow separation. In contrast, related art systems require sealing mechanisms that must be heat resilient due to the elevated heat exposure of their particular designs. This complicates the system, and increases manufacturing costs.

Yet another benefit is that the various embodiments function with a reduction in parts normally found in known oxidizers. For example, many known rotary valve regenerative oxidizers use metallic partitions contained within the heat exchange beds. This design results in maintenance concerns due to leakage and stress cracks, and is more costly to construct. No metallic partitions are utilized in the present invention and as such, leakage is reduced, manufacturing costs are minimized, and treatment efficiency is enhanced. Other known designs incorporate multi-component flow distributors. In accordance with the present invention, the rotary distributor 40 comprises a unified or one-piece structure, thereby eliminating the multiple parts found in known distributors, and reducing manufacturing costs.

The embodiments shown may also be tailored to accommodate a rotary thermal oxidizer by simply incorporating uncatalyzed heat exchange channels therein. Transfer chamber 16 may utilize a heat generating means, either internally or externally thereof, to ensure sufficient thermal oxidation of the process gases. On the other hand, gases containing elevated levels of VOCs, for example, may only need startup heat to maintain self-sustaining thermal and/or catalytic oxidation.

While the preferred embodiment of the invention has been disclosed, it should be appreciated that the invention is susceptible of modification without departing from the scope of the following claims.

We claim:

1. A rotary regenerative abatement system, for removal of contaminants from process gases, comprising:
   one or more rotors, wherein a first rotor having a cell density of at least 25 cells per square inch comprises a plurality of discrete heat exchange surfaces arranged in an axially parallel and longitudinal array, said first rotor having a first and a second end, wherein said surfaces form a plurality of heat exchange channels;
   a transfer chamber connected to the second end of said first rotor;
   a sealing endplate adjoining the first end of said first rotor, wherein said endplate divides said first rotor into inlet and outlet compartments;
   an adjustable means for rotating said first rotor about a longitudinal axis; and
   a stationary second rotor, positioned between said first rotor and said transfer chamber, wherein said second rotor comprises a plurality of heat exchange surfaces arranged in an axially parallel and longitudinal array, said surfaces forming a plurality of heat exchange channels in fluid communication with said first rotor and said transfer chamber, said second rotor having a cell density greater than that of said first rotor.

2. The abatement system of claim 1 further comprising an adjustable means for rotating said second rotor about a longitudinal axis.

3. The abatement system of claim 1 further comprising a means for purging unreacted process gases from said second rotor.

4. The abatement system of claim 1 wherein the surfaces of said second rotor are catalytically coated.

5. A rotary regenerative abatement system, for removal of contaminants from process gases comprising:
   a first heat exchange bed having a cell density of
   at least 25 cells per square inch comprising a plurality of heat exchange surfaces, arranged in an axially parallel and longitudinal array, each of said surfaces having a first and a second end, wherein said surfaces form a plurality of heat exchange channels;
   a transfer chamber communicating with the second end of said surfaces;
   a sealing endplate adjoining the first end of said surfaces, wherein said endplate divides said channels into inlet and outlet zones;
   a distribution plenum, fluidly communicating with said heat exchange surfaces;
   a gas inlet plenum, fluidly communicating with said distribution plenum;
   a gas outlet plenum, fluidly communicating with said distribution plenum;
   a one-piece, rotatable flow distributor, wherein said distributor fluidly communicates with said distribution, inlet, and outlet plenums; and
   a second heat exchange bed, positioned between said first heat exchange bed and said transfer chamber, said second heat exchange bed comprising a plurality of heat exchange surfaces arranged in an axially parallel and longitudinal array, wherein said surfaces form a plurality of heat exchange channels in fluid communication with said first heat exchange bed and said transfer chamber, said second bed having a cell density greater than that of said first heat exchange bed.

6. The abatement system of claim 5 further comprising a means for purging unreacted process gases from said second bed.

7. The abatement system of claim 5 wherein the surfaces of said second bed are catalytically coated.

8. A method for removing contaminants from process gases, utilizing a rotary regenerative oxidizer in an abatement process, said method comprising the steps of:
   directing contaminated process gases into a first end of a first heat exchange bed of said oxidizer, said first heat exchange bed comprising a cell density of at least 25 cells per square inch, wherein said abatement process further comprises a second heat exchange bed having a second plurality of axially parallel and longitudinally disposed heat regenerative channels, said second bed positioned between said first bed and a transfer chamber, and said second bed having a cell density greater than said first bed;
   forcing the process gases into a first end of a first plurality of axially parallel and longitudinal heat regenerative channels located within said first bed, for substantial oxidation of the gases therein;
   forcing the process gases through the second bed;
   forcing the process gases through the transfer chamber;
   forcing the process gases back through the second bed and into the first bed; and
   exhausting the process gases from the second bed, through the first plurality of channels and to the first end of said first bed, to heat said channels.

* * * * *